(12) United States Patent
Strand

(10) Patent No.: US 11,644,372 B2
(45) Date of Patent: May 9, 2023

(54) SMART LINE SENSOR

(71) Applicant: Wilhelmsen Ships Service AS, Lysaker (NO)

(72) Inventor: Tore Strand, Oslo (NO)

(73) Assignee: Wilhelmsen Ships Service AS, Lysaker (NO)

( * ) Notice: Subject to any disclaimer, the term of this patent is extended or adjusted under 35 U.S.C. 154(b) by 391 days.

(21) Appl. No.: 16/756,859

(22) PCT Filed: Sep. 3, 2018

(86) PCT No.: PCT/EP2018/073628
§ 371 (c)(1),
(2) Date: Apr. 17, 2020

(87) PCT Pub. No.: WO2019/076522
PCT Pub. Date: Apr. 25, 2019

(65) Prior Publication Data
US 2021/0190610 A1    Jun. 24, 2021

(30) Foreign Application Priority Data

Oct. 20, 2017 (NO) .................................. 20171686
Oct. 23, 2017 (NO) .................................. 20171695

(51) Int. Cl.
*G01L 5/101*    (2020.01)
*D07B 1/14*     (2006.01)
(52) U.S. Cl.
CPC .............. *G01L 5/101* (2013.01); *D07B 1/145* (2013.01); *D07B 2301/252* (2013.01); *D07B 2301/258* (2013.01)

(58) Field of Classification Search
CPC ... G01L 5/101; D07B 1/145; D07B 2301/252; D07B 2301/258
(Continued)

(56) References Cited

U.S. PATENT DOCUMENTS 4,461,459 A * 7/1984 Conti .................... G01L 5/101
                                                     254/270
5,517,864 A * 5/1996 Seppa .................... G01L 5/103
                                                     73/862.391
(Continued)

FOREIGN PATENT DOCUMENTS

CN      2709964     7/2005
CN     101519900    2/2008
(Continued)

OTHER PUBLICATIONS

Search report from China Patent Office dated Apr. 24, 2021.

*Primary Examiner* — Nathaniel T Woodward
(74) *Attorney, Agent, or Firm* — Christian D. Abel

(57) ABSTRACT

The invention relates to a sensor device for insertion and for measuring tension within a braided, plaited and/or laid line. The sensor device comprises an elongated sensor housing having an outer housing surface and an inner housing surface and at least one pressure sensor arranged inside the elongated sensor housing. The outer housing surface having a substantially elliptic or circular cross sectional area around the longitudinal axis of the sensor housing. Further, the at least one pressure sensor is configured to allow measurement, at least indirectly, of a pressure exerted on the outer housing surface. The invention also relates to a line sensor assembly for mooring of one or more structures, and a method of adjusting the tension in a line sensor assembly and the use of a line sensor assembly.

14 Claims, 11 Drawing Sheets

(58) Field of Classification Search
USPC .................................................. 73/862.391
See application file for complete search history.

(56) References Cited

U.S. PATENT DOCUMENTS

| | | | |
|---|---|---|---|
| 10,036,119 B1* | 7/2018 | Hall | ................. D07B 1/145 |
| 2011/0006899 A1 | 1/2011 | Eide | |
| 2017/0167242 A1* | 6/2017 | Katayama | ............ G01L 5/101 |

FOREIGN PATENT DOCUMENTS

| | | |
|---|---|---|
| CN | 102918372 | 2/2013 |
| CN | 101836133 | 6/2013 |
| CN | 205175599 | 4/2016 |
| CN | 205981523 | 2/2017 |
| CN | 206488877 | 9/2017 |
| DE | 102012108036 | 12/2013 |
| EP | 2096226 | 10/2013 |
| WO | WO 2009039252 | 3/2009 |
| WO | WO 2011120753 | 10/2011 |

* cited by examiner

SMART LINE SENSOR

TECHNICAL FIELD

The present invention relates to a sensor device, an assembly and a corresponding method for measuring and controlling tension in a line. More specifically, the invention relates to a sensor device, a line sensor assembly and a method of adjusting tension in such an assembly for heavy duty lines, such as mooring lines.

BACKGROUND ART

The lifetime of a line for fastening, lowering and/or securing objects, such as in maritime use, is dependent on a number of factors. Cyclical loads, which are typically imposed on a line in a maritime environment, may cause fatigue in parts of the line. Other factors such as temperature variations, together with wear and tear from handling, may also affect the fatigue resistance of a line.

Failure of such a line can have severe consequences. A fastened object may come loose, potentially moving violently and colliding with other objects or humans. In particular during handling of large floating structures such as ships, the force from a snapping line can kill or maim bystanders.

Such lines are therefore frequently inspected for any signs of damages or fatigue, the frequency of inspection typically being governed by bodies such as the OCIMF (Oil Companies International Marine Forum) which has decided upon a set of rules for inspection of lines on tankers, for example to document the amount of hours in use.

However, as the line's condition is not only dependent on the number of hours in use, the frequency of inspection may either be too low or higher than necessary. As per now, lines are inspected manually, for example by the crew in cases of mooring lines on ships. Should the line exhibit signs of damage or fatigue, it will typically be replaced with a new line. Manual inspection is time consuming and prone to human error. Also, manual inspection does not reveal line overload i.e. that the line may be close to breaking, and needs to be performed whilst the line is not in use.

To avoid the critical consequences the failure of a line can entail, inspection frequency and time is usually excessive. This inevitably leads to an undue amount of time spent on inspection of lines, valuable time that could have been spent on other tasks. Not to mention potentially wasteful replacement of lines, resulting in higher operating costs.

One known solution to this problem has been to place a detachable sensor at or partly within a line to measure loads acting on the line during operation. US patent application with publication no. US 2011/0006899 discloses a sensor unit for measuring loads on a line. In one embodiment, the sensor unit may be arranged at, or at least partly within, a line such as a strap. The sensor unit can be used in connection with anchoring/mooring and comprises a transmission device configured to transmit information to an external device. The external device may then use this transmitted information to make an operator observant of a possible critical state. However, as the sensor unit described in the application is asymmetrical and at least partially arranged outside of the line, its usage is limited. In lines which are passed over handling equipment such as winches, hawseholes or other equipment causing relatively rough treatment, a sensor unit arranged outside the line could interfere with the equipment and be subject to damage. Although the application describes an embodiment where the sensor unit is detachable from the line, detachment is only possible by disassembling the sensor unit and/or the line, which significantly complicates installment of the unit.

Therefore, there is need for a solution that can alleviate the shortcomings of the background art.

SUMMARY OF THE INVENTION

In view of this, it is an objective of the invention to provide a sensor device which may be inserted and used to measure tension in a variety of lines, especially heavy duty lines such as mooring lines. The sensor device is configured to measure and transmit data regarding use of the line, thereby reducing the frequency of inspections and replacement of the lines, whilst minimizing the risk of a line snapping.

Furthermore, it is an objective of the invention to provide a sensor device which may easily be placed or removed from within a line.

Another objective is to provide a sensor device which may comprise part of an intelligent line sensor assembly, allowing for self-adjustment of tension in the line.

Other objectives will be apparent for a person skilled in the art.

The present invention is set forth and characterized in the main claims, while the dependent claims describe other characteristics of the invention.

Accordingly, the present invention relates to a sensor device for measuring tension within a line, the sensor device comprising;
    an elongated sensor housing having an outer housing surface and an inner housing surface, outer housing surface having a substantially elliptic or circular cross sectional area around the longitudinal centre axis of the sensor housing and
    at least one pressure sensor arranged inside the elongated sensor housing, the at least one pressure sensor being configured to measure, at least indirectly, a pressure exerted on the outer housing surface. Elliptic cross-sectional area is hereinafter defined as to also include circular cross-sectional area.

Thus, the invention provides a sensor device that may be arranged centrally within a line, the sensor device being durable and therefore suited for lines subject to heavy loads, yet the sensor device may also be easy to deploy into and to retrieve from the line. The line may comprise a braided line, also known as a plaited line, or a laid line defined herein as a line formed by intertwining or twisting strands together. Such a braided, plaited and or laid line may typically comprise a heavy-duty line such as a mooring line. The sensor device may have a shape making it especially suitable for insertion into lines which are braided, plaited and/or laid, where the device may be inserted or extracted from the line by placing it between strands of the line. The elongated shape of the sensor housing may also make it especially suited to stay within a braided, plaited and/or laid line once inserted, as it has minimal effect on the strength of the line, and is not prone to slip out of the line due to high radial forces acting on the housing by the strands of the line during tensioning. The shape of the sensor device may be substantially shaped as prolate spheroid, and at least part of the maximum diameter D of the elongated sensor housing measured in direction perpendicular to a centreline C of the housing's longitudinal direction may be constant along at least a portion of the housing's longitudinal length L.

The sensor device may conceivably also be suitable for others kinds of elongated objects such as ropes, hawser, wires, straps, cables or any kind of line into which the device may be inserted, or a combination thereof. In prior art solutions, the known sensor devices for measuring tension within a line are typically adapted for integration with the line, which make these prior art sensor devices unsuitable for insertion to braided, plaited and/or laid lines.

By placing the sensor device inside the line, the device can measure the compression due to the radial movements of the strands of line during tensioning, and thereby indirectly measure tension in the line. The cross-sectional area of the outer housing surface around the longitudinal centre axis of the centre housing is preferably a circle where the distance from the periphery to a centre point is constant for 360 degrees. However, other elliptic shapes may also be possible, where the distance from the periphery to the centre may extend between 5% to 10% longer than from the shortest distance from the periphery to the centre point, for example 5%.

Each sensor should be able to measure the compression due to the radial movements of the strands during tensioning of the line. Based on the measured compression, the tension in the line can be estimated/calculated. In an aspect of the invention, the compression may be measured by a load cell arranged on the inside of the elongated sensor housing. However, other sensors such as manometers or similar pressure measuring means may also be used, as will be apparent to the person skilled in the art based on the disclosure of the invention herein. In aspects, one or more load cells may be arranged for redundancy, and to compare measurements for increased accuracy. A load cell may typically comprise a strain gauge, such as a foil strain gauge or semiconductor strain gauge or others known in the art. Strain gauges which are capable of being calibrated by a preset initial stress may be used, allowing these gauges to be calibrated according to need during their lifecycle. Preferably, strain gauges which require a small amount of electricity may be used in the sensor device.

In an aspect of the invention, the elongated sensor housing may comprise a material with a Young's modulus E, the material and design of the outer housing surface may in combination be configured to support a mean pressure exerted substantially perpendicularly on to the outer housing surface in excess of 1000 MPa over a period of 10 seconds at a temperature of 293 Kelvin without the sensor housing fracturing. Thus, the elongated sensor housing may advantageously comprise a linear elastic material. The elongated sensor housings resistance to fracture may also be defined by cycles of high loads which typically may lead to a fatigue fracture. Such a fracture being defined herein as a fracture being detectable preferably by visual inspection. The period of time the sensor device is exposed to such compression may for example be between 10-20 seconds. Preferably, the material may comprise a Young's Modulus E of at least 30 GPa. A material with a high Young's Modulus may be preferable for lines subjected to high loads, yet a material with a lower Young's Modulus may be more suitable to achieve a lower weight and increased safety for smaller lines and lines subjected to lower loads. Preferably, the material may comprise aluminium with a Young's Modulus between 65-75 GPa for lines subjected to lower tensions, such as 5-50 tons. For lines subjected to higher loads, a material comprising titanium with a Young's Modulus between 105-120 GPa may be more suitable, or for even higher loads a material comprising steel with a Young's Modulus between 190-210 GPa may be preferable. In aspects, the yield strength may be an important factor in choice of material of the elongated sensor housing, the yield strength being defined as the stress level at which the material starts to exhibit plastic deformation. Advantageously, the design sensor device is thus configured for heavy duty operation, such as mooring lines for ships, platforms and similar floating structures. The lines may typically be subject to a tension ranging from 10 kN to 3000 kN. The elongated sensor housing may comprise several parts, where the materials of each part may differ. Thus, the elongated sensor housing may comprise materials such as hard plastics, polymer-based compounds for example comprising nylon, PEEK, POM and fiber reinforced composites.

In an aspect of the invention, the elongated sensor housing may comprise a middle part, and two end parts detachably connected to the middle part. The middle part may typically comprise aluminium, steel or titanium, and the end parts may comprise materials such as hard plastics, polymer-based compounds for example comprising nylon, PEEK, POM and fiber reinforced composites. Preferably the end parts may comprise a plastic material which allows wireless data signals to be transmitted from inside the sensor housing, whilst the middle part comprises a material with sufficient strength to be subjected to high loads.

In an aspect of the invention, the ends of the elongated sensor housing in the longitudinal direction may be rounded. The rounded ends are thus preferably shaped so as not to comprise a sharp point which may damage the line or make the line weaker. In some aspects of the invention the tip of the end may therefore comprise the shape of a semicircle, with a radius of 1, 2, 3, or 4 millimetres. To avoid abrasion on the line, the elongated sensor housing may advantageously be smooth and without any sharp protrusion, edges, kinks or other shapes which may damage the line and/or influence properties of the line. In an aspect of the invention, the maximum diameter D of the elongated sensor housing measured in direction perpendicular to a centreline C of the housing's longitudinal direction may be constant along at least 15% of the total longitudinal length L. The length M of constant maximum diameter D may more preferably comprise at least 5% of the total length L, for example 15% of the total length L. Alternatively, the diameter may not be constant, such that the outer housing surface comprises a continuously curved shape. The design of the outer housing surface may also be further defined by the following parameters with exemplary values:

- a longitudinal length L of the outer surface of sensor device between 300-500 mm, more preferably 300-400 mm, for example 300, 350 or 400 mm.
- a maximum diameter D of the outer surface of the sensor device's housing between 30-70 mm, more preferably between 30-50 mm, for example 30, 40 or 50 mm.
- a mid length M defined as the distance along the outer housing surface between the two planes where the diameter D starts to narrow down towards the housings termination points, where M may be between 15%-90% of L,
- a ratio between maximal diameters/length (D/L) between 1-20%, more preferably 2-15%, most preferably 4-8%, for example 5%.
- an angle θ between;
  - a straight line extending from the end point of length M and perpendicular onto the longitudinal centerline C of the housing and
  - a straight line extending from the end point of length M to the closest termination point of the outer housing surface, where the angle θ may be at least 70°, preferably at least 80°, even more preferably at least 85°, for example 87°.

As will be apparent to the person skilled in the art based on the disclosure of the invention herein, the design of the outer surface housing may also be adapted to certain kinds of line, such as heavy duty mooring lines, for example braided from twelve strands. A high diameter may make the sensor liable to weaken the line, and also increase the force acting from the line on the sensors, a sensor with a low diameter may therefore be preferable. The middle part of the elongated sensor housing may typically extend the length M with constant maximum diameter D, and the detachable end parts may extend from the termination points of the outer housing surface to the middle part. The detachable end parts may typically also form part of the length M, as the attachment between the middle parts and detachable end parts may overlap and form part of the constant diameter D.

In an aspect of the invention, at least one end of the elongated sensor housing in the longitudinal direction may be removably connected to the sensor housing by fixing means such that the removal of the at least one end allows free access to the internally arranged at least one pressure sensor. In some aspects, only one end of the longitudinal housing is releasably connected. In further aspects, both ends are releasably connected, advantageously, this may allow the sensor device to be disassembled from both ends to access equipment inside the housing, which may be beneficial if one end of the longitudinal housing is damaged and does not open. It may be desirable to disassemble the sensor device to repair or replace equipment located inside the sensor housing. In some aspects of the invention, data which has been recorded may be retrieved by disassembling the sensor housing. The fixing means may comprise bolts, screws, glue, hinges, vulcanized rubber or any other fixing means that are known in the art, and which are capable of withstanding the forces exerted on the sensor device during use. In some aspects of the invention, the removable ends of the elongated sensor housing in the longitudinal direction may comprise a material with a different Young's Modulus to the sensor housing, preferably the material of the removable ends has a Young's Modulus above 2 GPa.

In an aspect of the invention, the outer housing surface may comprise a plurality of grooves, wherein each groove may have a design that is adapted for receiving a strand when the sensor device is inserted centrally within a braided, plaited and/or laid line. Advantageously the grooves may reduce local stresses on the housing as they are configured to receive the innermost strands of line, thereby allowing strands further out from the radial centre of the line to also be in contact with the housing. Thus, a greater number of strands in contact with the housing ensures a more evenly distributed pressure on the housing. Additionally, the grooves may prevent the sensor device from slipping up and down the longitudinal axis once it is placed inside the line. As different lines may have different sizes and numbers of strands, the grooves may be dimensioned with corresponding angles, spacing, depth and width of the grooves adapted for a certain kind of line.

In an aspect of the invention, the sensor device may further comprise at least one temperature sensor arranged within the sensor housing. The at least one temperature sensor may be configured to at least indirectly measure temperature within a braided, plaited and/or laid line at or near an insertion point of the sensor device into the line. Preferably, the at least one temperature sensor is located within the sensor housing such that it can measure the temperature of the line as a function of time. As the lifetime of a line may be dependent on its exposure to different ambient temperatures it is desirable to gather this data. The temperature sensor may also be useful to calibrate the pressure sensors measurements, as pressure sensors measurements such as load cells, may be affected by thermal expansion of the sensor device housing. The temperature measurements may therefore be used to compensate for any effect thermal expansion may have, when calculating the tension in the line.

In an aspect of the invention, the sensor device may further comprise a data recording unit arranged within the sensor housing for recording data received from any of the at least one pressure sensor. Preferably, the data recording unit measures the pressure as a function of time. Thus, it will be possible to collect this data and compare it with the condition of a line, which may give a valuable insight into how tensioning affects the lifetime of a line. Direct access to the data recording unit may be possible when the sensor housing is disassembled by connecting the data recording unit to an external device such as a personal computer, via e.g. a USB connection.

In an aspect of the invention, the sensor device may further comprise a data recording unit arranged within the sensor housing for recording data received from the at least one pressure sensor or the at least one temperature sensor or a combination thereof. Preferably, the data recording unit also measures the temperature as a function of time. Thus, it will be possible to collect these data and compare them with the condition of a line, which may give a valuable insight into how temperature and tension affect the lifetime of a line.

In an aspect of the invention, the device may further comprise a data transmitting unit arranged within the sensor housing for transmitting data from the data recording unit, or data measurements by any of the pressure or temperature sensors to an external receiver during use. The data transmitting unit may also be configured to receive data signals from an external transmitter during use. Preferably the data transmitting unit, and other electronic components such as the data recording unit and sensors may be coupled to a power supply, such as a battery, although all of the internal equipment may have their own, or otherwise shared batteries. The external receiver may be arranged on a structure to which the line is secured. In some aspects of the invention, the data transmitting unit may be connected to the external receiver via a wire, the wire may be arranged in the line or alongside the line. In one aspect of the invention, the data transmitting unit continuously transmits data directly from the sensors to the external receiver, this advantageously allows real time adjustments to be made based on this data. As continuous transmitting of data may be relatively power consuming, the transmitting unit may in other aspects be configured to send recorded data from the data recording unit. Depending on the required battery lifetime, storage/recording capacity and need for real time measurements, data may be transmitted in intervals of 1, 5, 10, 20, 30, 40 or 50 seconds, or in intervals of 1, 2, 3, 4, 5, 10, 20, 30, 40 or 50 minutes, or in intervals of 1, 2, 3, 4, 5, 6, 12 or 24 hours. Typically, however, data may be transmitted in intervals ranging from 10 seconds to 3 minutes, for example 1 minute. In other aspects the transmitting unit may be configured to send data in given intervals, whilst also being configured to send data instantaneously if a given parameter is reached such as critical tension in the line. The transmitting unit may also be configured to send data instantaneously, independent of given intervals, for example if the tension in the line changes by a given parameter, e.g. a change of tension equal to or more than 0.5 tonnes, 1 ton, 1.5 tonnes or any other given parameter. In some configurations, the transmitting unit may be configured such that it only transmits signals when it detects an external receiver, and may be configured to detect for an external receiver at given intervals. Thus, the sensor device may minimize its battery usage, which may be advantageous in configurations where the sensor device does not comprise a data recording unit. The data recording unit and data transmitting unit may each be arranged to process the measured data from the sensors, to determine if aforementioned parameters have been reached. The equipment in the sensor device may also be configured to send a signal through the data transmitting unit should any of the sensors or recording unit be malfunctioning or be in need of replacement, or if the battery is low on power.

In aspects, the sensor device may be configured to transmit and receive signals to a plurality of external receivers, which may be arranged such that there is redundancy to the sensor device should one external receiver fail to connect with a sensor device, e.g. if the external receiver is not operative. In aspects, a sensor device may be configured to transmit and receive signals from other sensor devices. Thus a plurality of sensor devices may relay data signals, operating as a mesh network of nodes, providing greater redundancy in a system of sensor devices should one sensor device be unable to reach an external receiver.

An external receiver may relay the data signals with wireless transmitting means such as WiFi and/or through electronic cabling or equipment. For example, an external receiver arranged on a ship may use the ships electric power supply network to transmit data signals from the external receiver to a control unit or system, for example arranged on the bridge of the ship.

In an aspect of the invention, the data transmitting unit may comprise wireless transmitting means. In an aspect, acoustic transmission may be used, for example in underwater environments such as for the mooring of floating platforms or aquaculture installations. The wireless transmitting means may comprise Bluetooth technology such as Bluetooth 4, Bluetooth 5, WiFi, LoRa WiMax, ZigBee, or other similar well-known technologies or combinations for transmitting wirelessly in an Internet of Things. Preferably, the wireless transmit means may comprise Bluetooth 5 technology as this provides a long range capability to transmit signals, whilst having relatively low battery usage. In aspects, the data transmitting unit may comprise a SIM card, thus being able to transmit data signals via mobile technology networks.

In an aspect of the invention, at least one end of the elongated sensor housing in the longitudinal direction may comprise a core strand attachment means for attaching a core strand to the elongated sensor housing. Advantageously, at least one core strand attachment means being attached to a core strand may prevent the sensor device from jumping out of the centre of the braided, plaited and/or laid line when exposed to high compressional forces. In some aspects, the sensor device may have several core strand attachment means at different points on the outer surface housing, for example such that the sensor device may be attached to two core strands at both ends of the elongated sensor housing in the longitudinal direction.

In an aspect of the invention, the core strand attachment means may comprise a through-going hole for threading a core strand therethrough. Advantageously, a core strand may thus be attached to the sensor device without requiring knotting or splicing at the attachment means.

In an aspect of the invention, at least one end of the elongated sensor housing in the longitudinal direction may be removably connected to the sensor housing by fixing means such that the removal of the at least one end of the elongated sensor housing may allow free access to the internally arranged at least one pressure sensor, and wherein the core strand attachment means may display at least one core strand receiving channel extending into the at least one removably connected end of the elongated sensor housing, the end of the channel may display an end part having a larger average radial diameter compared to the remaining part of the channel. A larger average radial diameter may preferably entail up to a 15% increase in average radial diameter, most preferably up to a 25% increase, for example 20%. Thus, the end of the channel may comprise a volume suitable to accommodate a knotted or spliced end of a core strand or other means for attaching an end of the core strand to the sensor housing, and where the core strand extends out through the channel and to an attachment point with a regular strand in the line.

In an aspect of the invention, the end part of the channel may be a blind hole.

The invention further relates to a line sensor assembly. The line sensor assembly comprises;
  a braided, plaited and/or laid line and
  at least one sensor device arranged centrally within the braided, plaited and/or laid line.

The at least one sensor device comprising a sensor housing having an outer housing surface and an inner housing surface and a pressure sensor arranged inside the sensor housing. The pressure sensor being configured to measure, at least indirectly, a pressure exerted on the outer housing surface. Further, the outer housing surface has a substantially elliptical or circular cross-sectional area perpendicular to the longitudinal centre axis of the sensor housing, for example a design being rotational symmetric around the longitudinal axis of the sensor housing.

In aspects, the line sensor assembly may comprise a first sheath, such as a plastic mesh sheath, arranged between the sensor device and the strands of the braided, plaited and/or laid line. The first sheath may increase friction between the sensor device and the strands of the line, thus preventing any slipping of the sensor device inside the line, and also preventing the sensor device from being flung away at high speeds in case of line breakage.

In aspects, the line sensor assembly may comprise a second sheath, such as a canvas, arranged around the braided, plaited and/or laid line where the sensor device is arranged in the line. The second sheath may prevent the sensor device from being flung away at high speeds in case of line breakage.

Advantageously, the sensor device may be designed for a specific kind of line, thus giving an optimal assembly. In some aspects of the invention the assembly may be for mooring. However, mooring should be understood herein as securing the line between at least one structure and another object, typically a floating structure. In more specific aspects, such floating structures may comprise ships, floating platforms or barges. However, the invention may in other aspects also be suitable for lowering objects from a floating structure, such as lowering a subsea module to the sea floor by a suitable crane.

In an aspect of the invention, the at least one sensor device of the line sensor assembly may be in accordance with any of the abovementioned aspects of the sensor device.

In an aspect of the invention, the assembly may further comprise;
  a first securing means arranged on a first structure, wherein a first line end of the braided, plaited and/or laid line is fastened to the first securing means, and a second line end of the braided, plaited and/or laid line is fastened to a second securing means arranged on a second structure. The securing means may comprise static securing means such as bollards or dynamic securing means capable of winching, for example capstans. In a specific example the securing means comprise bollards located on a land structure and on a floating structure. Alternatively, the securing means comprise one winch arranged on a first structure and a bollard arranged on a second floating structure distance from the first structure.

In an aspect of the invention, the assembly may further comprise at least one data receiver for receiving data signals from the at least one sensor device and a control system for processing received data signals. Preferably, the data receiver and control system are arranged together, such as on one of the structures. As will be apparent to the skilled person, the data receiver in the line sensor assembly may comprise the aforementioned external receiver and external transmitter which the data transmitting unit is arranged to transmit and receive data signals to. In some aspects, the data receiver and control system may comprise portable systems, such as a laptop, mobile phone or other hand-held devices.

In an aspect of the invention, the first securing means may comprise a winching means being configured to receive tension related data from the at least one sensor device in use, and to reel out or in the braided, plaited and/or laid line, or be still, in accordance with the tension related data received from the at least one sensor device and pre-programmed instructions. Or of course the winching means may remain inactive if the tension is found to be satisfactory.

Advantageously, the assembly may thus be self-regulating, thereby being able to avoid potentially hazardous high levels of tension in the line. Furthermore, the winching means may be capable of adjusting the line to achieve a constant desirable tension, or to avoid recurring high levels of tension which may decrease the lifetime of the line.

In an aspect of the invention, the winching means may comprise;
a data receiver for receiving data signals from the at least one sensor device in use,
a winch motor for reeling in or out the braided, plaited and/or laid line such that the line tension is changed, and
a control system for processing received data signals and to control the reeling operations set by the motor.

In an aspect of the invention, the line sensor assembly may further comprise:
at least one core strand attached to the a strand of the braided, plaited and/or laid line,
at least one end of the elongated sensor housing in the longitudinal direction comprising a core strand attachment means, and where
the at least one core strand is attached to the core strand attachment means, thereby securing the sensor device to the braided, plaited and/or laid line. In an aspect of the invention, the braided, plaited and/or laid line may comprise at least one core strand fixedly attached to the sensor device. The at least one core strand may preferably be braided in, or otherwise attached with the other strands in the braided, plaited and/or laid line. Advantageously, the core strand may be an additional strand in the braided, plaited and/or laid line, and comprise a different material from the other strands in the line. The core strand may preferably be designed to prevent the sensor device from jumping out of the centre of the braided, plaited and/or laid line when exposed to high compressional forces.

Furthermore, the invention relates to a method of predicting at least one integrity of the line in a line sensor assembly according to any of the abovementioned aspects, the method comprising the steps of:
measuring, at least indirectly, pressure in a direction perpendicular to the longitudinal direction of the sensor housing,
recording data measured by the pressure sensor over a period of 100 hours or more of use,
transmitting the recorded data from the sensor device to a data receiver,
processing the data in a control system and
estimating, based on the processed data and pre-programmed line parameters, the one or more integrities of the braided, plaited and/or laid line. The data may be stored within the sensor housing or in an external storage medium or a combination thereof.

Advantageously, statistics regarding the use of a line may thus be gathered, and used to predict the lifetime of a line. The period of recording data may be determined by the memory capacity of the recording device in the sensor device, and could be in the range of 100 hours in use to 10 000 hours in use, for example 1000 hours. In other aspects, the memory capacity of the recording device is sufficient to record data for the entire lifetime of the line, especially if the sensor is fully integrated i.e. remains in the line over its lifetime. The pre-programmed line parameters may comprise information related to the previous use of the line and its initial integrity i.e. statistics regarding hours in use and exposure to variations in tension and/or temperature over time in use, thickness and material choice of the strands in the line, maximum working strength, breaking strength and how parameters such as tension and temperature over time may affect the integrity of the line. The estimation of the integrity of the line will thus be a function of the integrity of the line prior to use, and how this is affected by its exposure in use to the aforementioned parameters. Reduced residual rope capacity may also be indicated by measuring if the rope tension has surpassed a certain percentage of the defined rope MBL (minimum breaking load), e.g. 50, 60, 70% of the rope MBL.

Furthermore, the invention relates to a method of adjusting the tension in a line sensor assembly according to any of the abovementioned aspects, the method comprising the steps of:
measuring, at least indirectly, pressure in a direction perpendicular to the longitudinal direction of the sensor housing, or any perpendicular component of the pressure,
transmitting the data from the sensor device to the winching means,
processing the data in a control system and
determining, based on pre-programmed instructions and the processed data, whether or not the tension in the braided, plaited and/or laid line should be adjusted. The pre-programmed instructions may be set according to the type of line being used in the assembly, and what tension it is designed to withstand. Other pre-programmed instructions may include aforementioned pre-programmed line parameters with data concerning the previous life of a line, e.g. how long it has been in use and under what kind of tensions and temperatures which may be useful in estimating the condition of the line and how much tension it is likely to withstand or when it should be replaced.

Moreover, the invention relates to a method of inserting a sensor device into a braided, plaited and/or laid line comprising at least three strands, the method comprising the step of:

inserting the sensor device in between the strands of the line such that the sensor device is arranged centrally within the strands of the line and in a longitudinal direction of the line. By arranging the sensor device within the centre of the strands, the sensor may measure compression due to the radial movements of the strands during tension.

In an aspect of the invention, the method may comprise the steps of:

identifying an insertion point along the braided, plaited and/or laid line, and creating an opening between two strands at the insertion point, the size of the opening being sufficient to insert a sensor device centrally within the strands, wherein the steps of identifying the insertion point along the braided, plaited and/or laid line and creating the opening between the two strands may be performed prior to the step of inserting the sensor device. In an aspect of the invention, where a sensor device may be according to any of the abovementioned aspects, the method may further comprise the steps of arranging the strands to fit within the grooves of the outer housing surface.

As for the former method, the data may be stored within the sensor housing or in an external storage medium or a combination thereof.

Additionally, the invention relates to a use of the line sensor assembly according to any of the abovementioned aspects, for performing at least one of the following operations:

mooring at least one floating structure,
towing at least one floating structure,
adjusting at least one rigging line on a sail, and
lowering a subsea installation from a floating structure.

Throughout the description and claims different words and terms are used, the definitions of these and other characteristics of the invention will be clear from the following description of a preferential form of embodiment, given as a non-restrictive example, with reference to the attached drawings wherein;

DETAILED DESCRIPTION OF THE INVENTION

The inventive concept will now be described more fully hereinafter with reference to the accompanying drawings.

Figure 1:
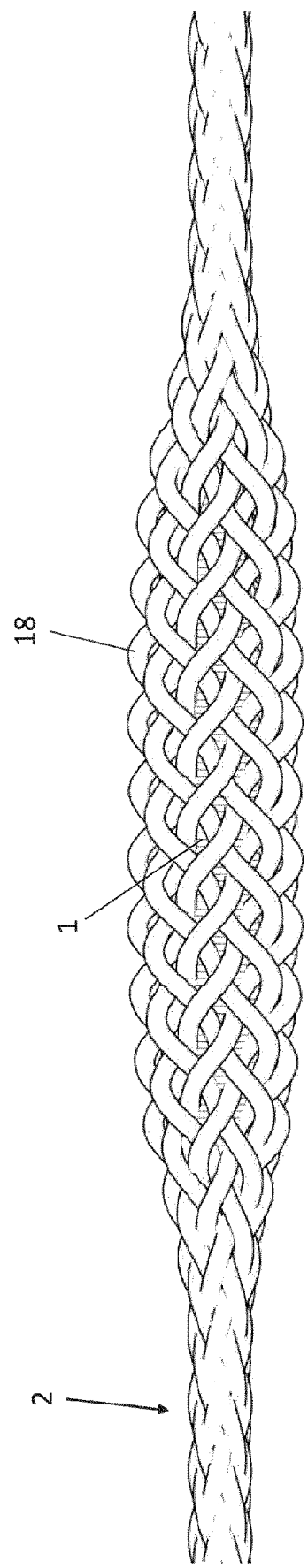
FIG. 1 illustrates an aspect of the invention, where a sensor device is shown arranged centrally within a braided line.

In FIG. 1 an aspect of the invention is shown where an inventive sensor device 1 is arranged centrally within a braided line 2, as may be the case during use of the sensor device 1. The braided line 2 in FIG. 1 comprises twelve strands 18. However, a line 2 may comprise any number of strands 18, as long as the sensor device 1 can be arranged centrally therein.

Figure 2:
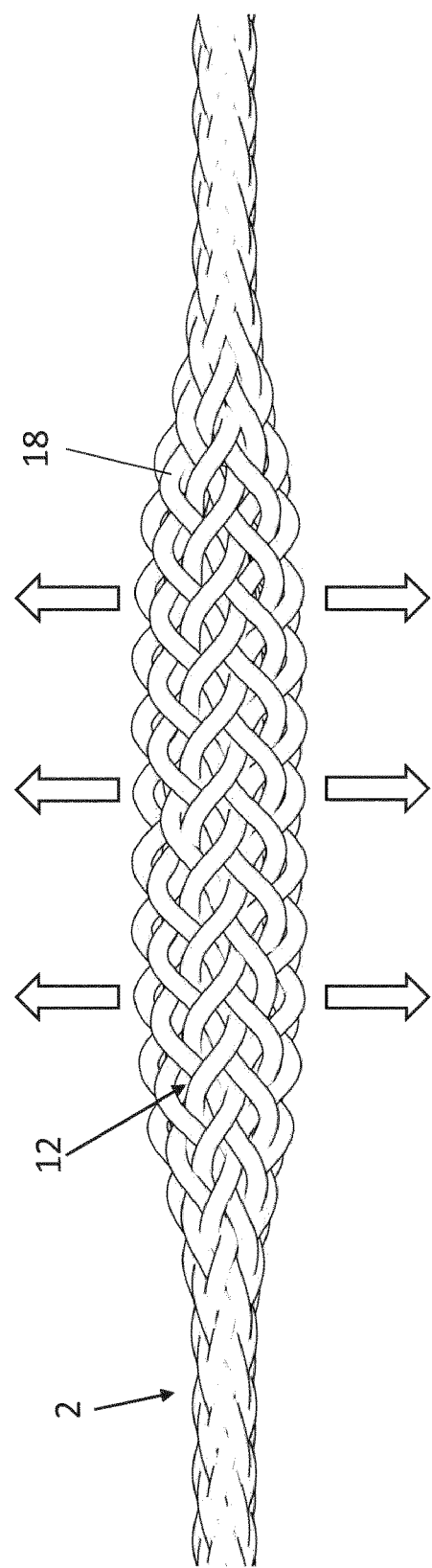
FIG. 2 illustrates an aspect of the invention, where a braided line is shown with a possible insertion point for a sensor device.

FIG. 2 also shows a braided line 2 comprising 12 strands, but without the sensor device 1 installed. The strands 18 of the line are shown pulled apart, thereby to provide an opening in between the strands 18 sufficient for insertion of the sensor device 1. When the sensor device 1 is to be deployed, an insertion point 12 must first be identified along the line. The insertion point 12 can be located anywhere along the line and will normally be chosen according to case to case considerations such as the distance between the sensor device 1 and an external receiving unit 15 to which the sensor device 1 is configured to transmit signals. Other considerations for choice of insertion point 12 may include avoiding potential damage to the sensor device 1, i.e. by choosing an insertion point where the sensor device is less vulnerable to collisions with external objects, or less likely to collide with external objects.

At the insertion point 12, the strands 18 of the line 2 separated as indicated by arrows illustrated in FIG. 2, for example by exerting external radial force (i.e. along the arrows) and/or by compressing the line 2 longitudinally. These actions provide the desired opening of sufficient size, into which the sensor device 1 may be inserted fully into the centre of the line 1.

Figure 7:
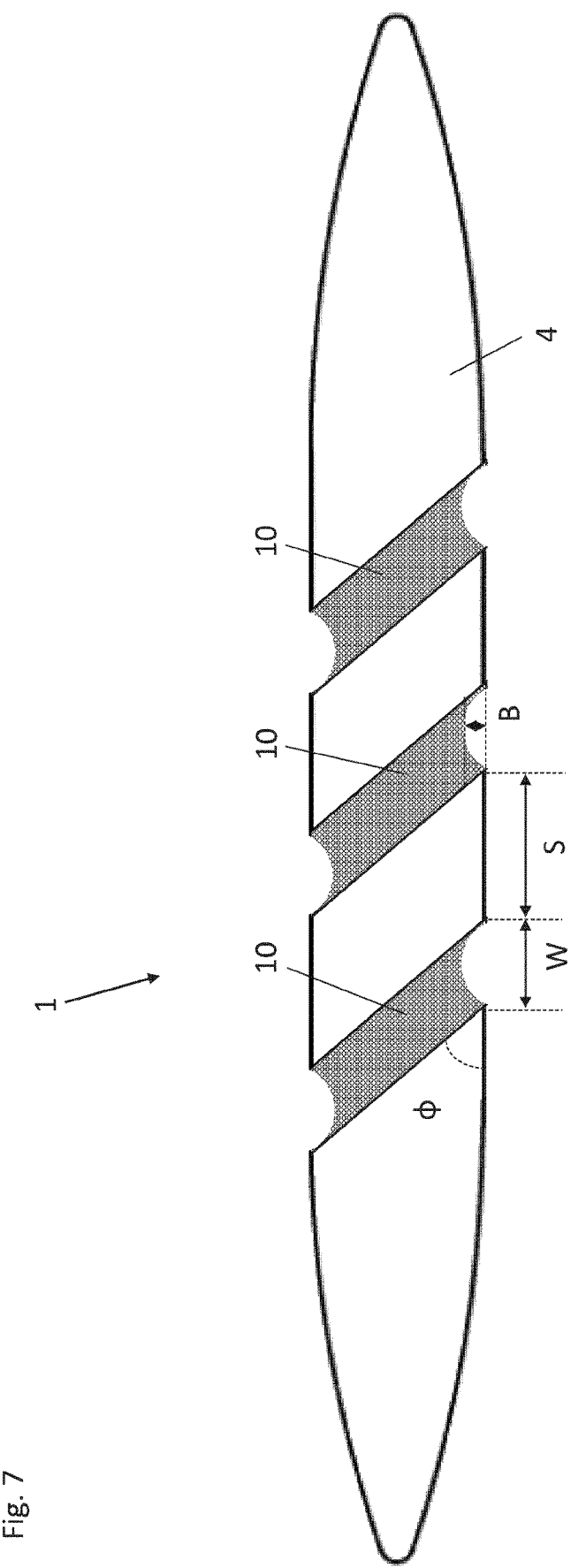
FIG. 7 schematically illustrates an aspect of the invention, where the outer housing surface of the sensor device displays a plurality of grooves.

In one embodiment the sensor device 1 may display a plurality of grooves 10 arranged in the outer housing surface 4, as illustrated in FIG. 7. The grooves 10 are in this embodiment preferably shaped in order to fit the design of the particular line 2 in use. For example, each groove 10 may be manufactured with respect to size, shape, spacing, depth and angle in order to fit with the arrangement and size of the surrounding strands 18. After insertion of the sensor device 1 with grooves 10, the sensor device 2 and/or the strands 18 may be readjusted so that at least one of the strands are fitted into a groove 10.

A data transmitting unit 13 in the sensor device 1 may be configured to be signally connected to the external receiver 15 via a wire. In this particular setup, the wire is connected to the device 1, and may be arranged inside and/or along the outside of the line 2 after insertion of the sensor device 1 into the line 2. In an alternative setup, the transmitting unit 13 may comprise an internal antenna which is signally connected to the external receiver 15. In some aspects, the antenna may be configured to extend out of the sensor device 1, or fitted to the sensor device 1 after insertion into the line 1. Further, the antenna may protrude from between the strands 18 to be able to transmit data signals more efficiently.

Figure 3:
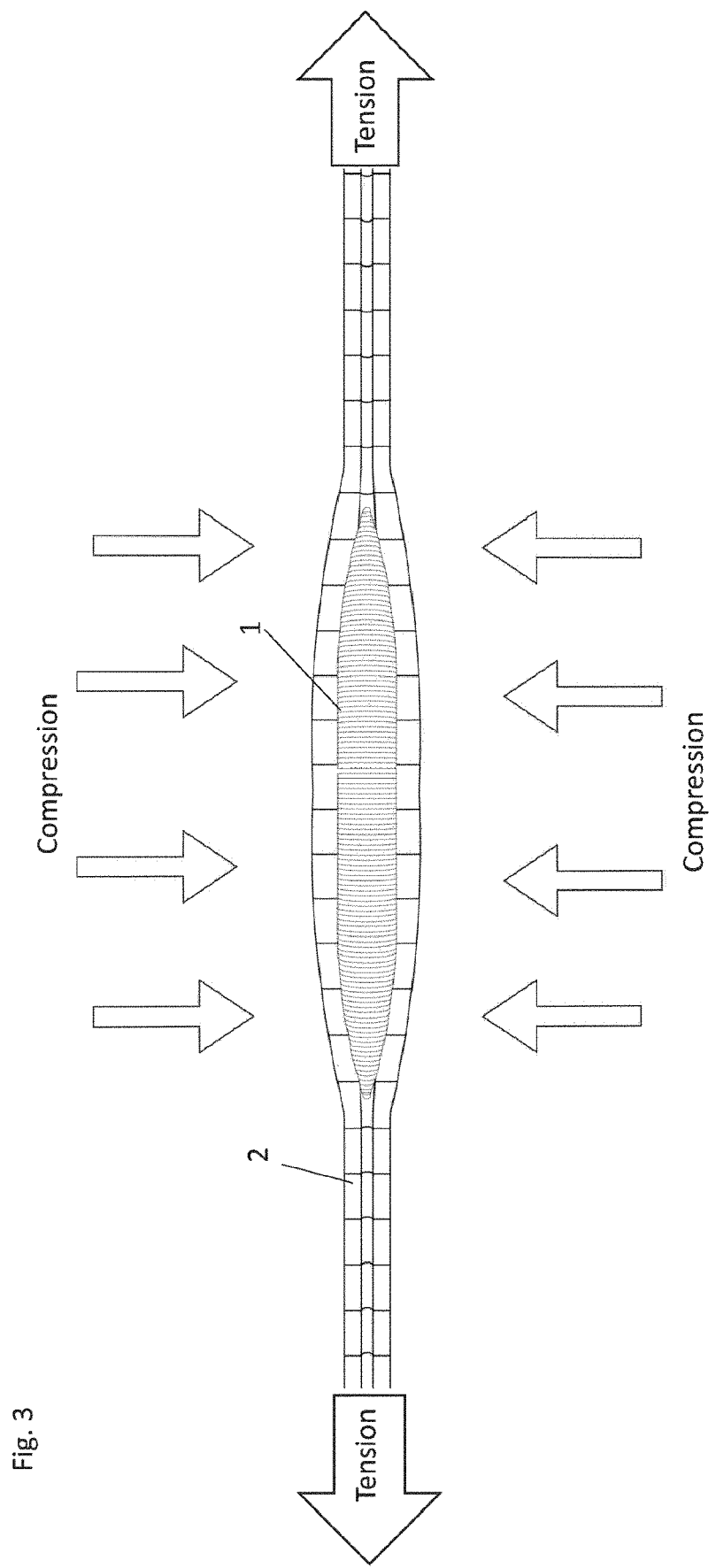
FIG. 3 schematically illustrates an aspect of the invention, where a sensor device is arranged centrally within a braided, plaited and/or laid line, the line being subject to tension, resulting in a radial compression.

FIG. 3 schematically illustrates the forces acting on the line 2 and the sensor device 1 during use. The line tension is illustrated by two arrows acting as two forces in substantially opposing directions along the longitudinal axis of the line 2. These two opposing forces cause a radial contraction of the line 2 around the longitudinal axis, resulting in compression of the sensor device 1 arranged inside the line 2. Hence, by measuring directly or indirectly the amount of compression on the sensor device 1, the tension in the line 2 can be calculated/estimated.

Figure 4:
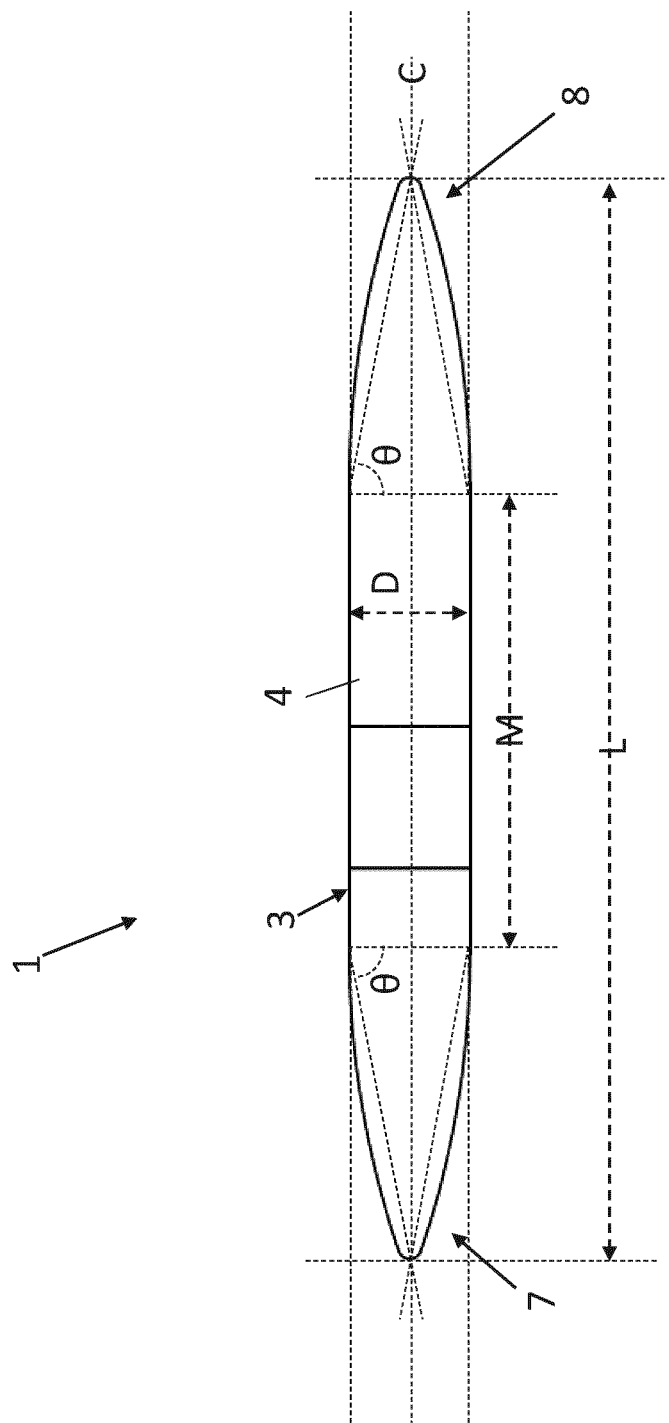
FIG. 4 schematically illustrates an aspect of the invention, where a sensor device is shown with various aspects of its dimensions.

FIG. 4 illustrates an aspect of the invention where a profile view of the outer housing surface 4 is displayed in an assembled state, perpendicular to the longitudinal axis of the housing 4. Labels D, M, L, C and θ symbolize, respectively;
the diameter D at the thickest part along the outer housing surface 4,
the length M of the sensor's outer housing surface 4 having a substantially constant diameter,
the total length L of the sensor's outer housing surface 4,
the centerline C of the sensor's outer housing surface 4 extending in the longitudinal direction and
the angle θ between;
a straight line extending from the end point of length M and perpendicular onto the longitudinal centerline C of the housing and
a straight line extending from the end point of length M to the closest termination point of the outer housing surface.

The shape of the outer housing surface 4 is preferably optimized to withstand the compression forces the line 2 during use, whilst causing minimal interference with the normal function of the line 2 and avoiding the sensor device 1 slipping out of the line 2. Accordingly, the outer housing surface 4 is elongated, and rotationally symmetric around the centerline C defined by the longitudinal axis of the sensor device 1. As seen in FIGS. 4-7 the outer housing surface 4 comprises an elongated cylindrical shape with the ends of the elongated sensor housing in the longitudinal direction being rounded 7,8.

The curvatures of the ends of the elongated sensor housing in the longitudinal direction 7,8 are preferably not linear, but rounded such that there is minimal damage on the line 2 from edges or sharp points. The end of the elongated sensor housing in the longitudinal direction may therefore comprise the shape of a semicircle, with a radius of 1, 2, 3, or 4 millimetres. The curvature is also arranged to withstand shear forces while preventing the sensor device 1 from jumping out from the centre of a line 2 under compression.

Furthermore, the design of the elongated sensor housing 3, combined with the material of which it is produced, enables the sensor device 1 to withstand the extreme forces that may occur during use. The compression of the strands 18 may result in a mean pressure exerted substantially perpendicularly on to the outer housing surface 4 in excess of 1000 MPa at 293° K. The elongated sensor housing 3 therefore preferably comprises a steel, aluminium or titanium material. As such, the material should have a Young's Modulus E of at least 30 GPa, for example between 65-75 GPa for lines subjected to lower tensions, such as 5-50 tons. For lines subjected to higher loads, a material comprising titanium with a Young's Modulus between 105-120 GPa is more suitable, or for even higher loads a material comprising steel with a Young's Modulus between 190-210 GPa is preferable. The elongated sensor housing 3 is preferably designed to handle temperature variations ranging from 273° to 320° Kelvin whilst subject to these mechanical forces. A larger allowable temperature range may also be envisaged.

Depending on the size of the line 2, and under what conditions the line is to be used, the sensor device 1 may have a length L of 300-500 mm. Likewise depending on the size of the line 2, and its use, the sensor device 1 may have a maximum diameter D of 30-70 mm, for example 30, 40, 50, 60 or 70 mm. The relationship between maximal diameters/length D/L may preferably lie between 2-8%, for example 5%.

As mentioned above, the outer surface 4 of the sensor housing 3 has a maximal diameter D. This maximum diameter D is preferably constant, or near constant, for a length M measured along the radially centered longitudinal axis of the outer housing surface 4. Further, the length M is at least 5% of the total longitudinal length L of the outer housing surface 4, for example 15%. The optimal length M depends on the particular line 2 in which the sensor device 1 is to be used. Alternatively, the diameter may not be constant, such that the outer housing surface comprises a continuously curved shape and M is 0%. It should also be noted that the constant maximal diameter D is measured as if no grooves 10 are present on the outer housing surface 4. The angle θ is preferably at least 85°, for example 87°.

Yet further variations and combinations of sensor devices 1 with different dimensions can be designed for a certain kind of line 2. These are however not explained or illustrated in further detail herein as they are too numerous and will be obvious to the person skilled in the art based upon the disclosure of the invention herein. Accurate testing under realistic and representative conditions may reveal optimum values for D, M, L, C and θ.

Figure 5:
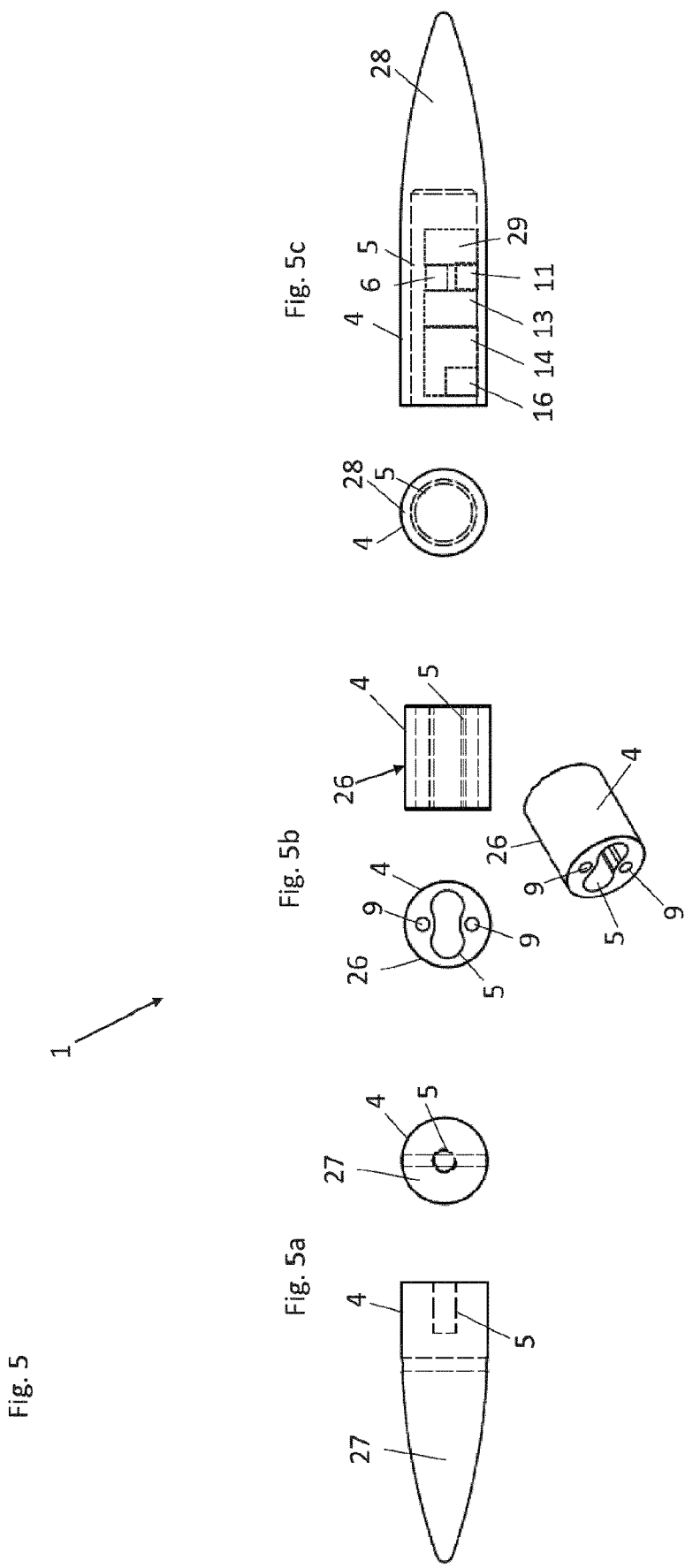
FIG. 5 schematically illustrates an aspect of the invention, where a sensor device is shown in a disassembled state.

FIG. 5 illustrates a sensor device 1 where the elongated sensor housing 3 is split into three parts, two end parts 27, 28 and a middle part 26. These parts are shown in different graphical perspectives in FIGS. 5a, 5b and 5c. The different parts are detachable with fixing means 9, exemplified in FIG. 5b as cylinders for reception of screws or the like. The end parts 27,28 can comprise different materials from the middle apart, preferably a material with a lower Young's Modulus than the middle part 26, for example a Young's Modulus of at least 2 GPa.

FIG. 5a illustrates a first end part 27, in two different perspectives; perpendicular to the longitudinal axis and a cross sectional view into the longitudinal axis. In the perpendicular view, the inner housing surface 5 is shown in stapled lines extending a distance in from the edge of the first end part 27. Though not illustrated in FIG. 5a, the first end part 27 also comprises fixing means 9 for attachment to the middle part 26. The first end part 27 and middle part 26 can also comprise equipment such as sensor units.

FIG. 5b illustrates a middle part 26, in three different perspectives;
perpendicular to the longitudinal axis,
cross sectional into the longitudinal axis and
three dimensionally from a side angle.

In the perpendicular view, the inner housing surface 5 is shown in stapled lines extending through the middle part 26 from edge to edge. The cross sectional and three dimensional views show fixing means 9 for attachment to the end parts 27,28. Though not shown in FIG. 5b, the middle part 26 can also comprise components such as sensor units.

FIG. 5c shows the sensor's internal components, schematically illustrated with dashed lines inside the second part 28. A pressure sensor 6 and temperature sensor 11 register compression and temperature, respectively, and the information is recorded by a data recording unit 13. The data recording unit 13 preferably comprises some processing abilities to estimate tension in the line 2 as well as to determine whether one or more signals are required to be transmitted immediately to a transmitting unit 14, e.g. due to excessive tension in the line 2. Otherwise, the recording unit 13 may store the data received from the sensors 5,6 for a certain period of time before the data is sent to a transmitting unit 14. Typically, data concerning excessive tension is stored temporarily and can be written over, whilst data collected over a longer period of time is stored. The transmitting unit 14 may comprise a wireless connection and/or an antenna for wireless transfer and is configured to transmit the data to an external receiver 15. Furthermore, a power source 29 for powering the sensor device's 1 internal equipment, such as a battery, is preferably also included inside the elongated sensor housing 3. A connection means for data transfer, such as a USB port or similar, may also be included inside the elongated sensor housing 3. The connection means for data transfer can be used when the sensor device 1 is in a disassembled state, for example for transferring data from the data recording unit 13 and/or for configuring/reconfiguring the internal equipment.

It should be noted that though the outer housing surface 4 is rotationally symmetric, the inner housing surface 5 may comprise different shapes, volumes and cavities. The shape of the inner housing surface 5 is governed by considerations such as the strength requirements of the sensor device 1 to withstand external pressure, plus space and arrangement requirements for the internal equipment. As illustrated in FIG. 5b, the cross sectional of the middle part 26 has a varying wall thickness such that the thicker portions of the wall may accommodate fixing means 9. The stadium shaped inner longitudinal hollow section of the middle part 26 may be advantageous in controlling the deflection direction of the housing, i.e. in the direction of the load measuring device, e.g. strain gauge.

The arrangement in FIG. 5 is schematic and merely for illustrative purposes, many variations of inner volumes and different configurations of the internal equipment are possible and will be apparent to the person skilled in the art based on the disclosure of the invention herein.

Figure 6:
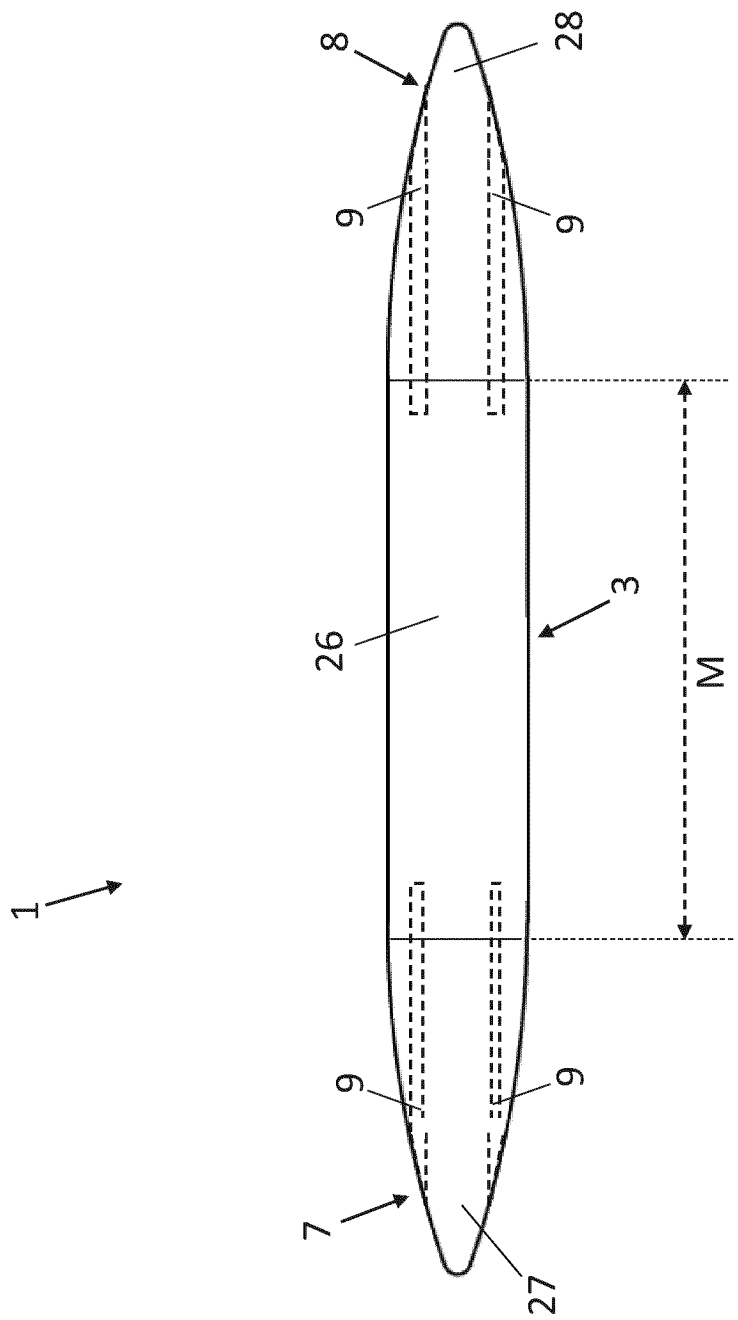
FIG. 6 schematically illustrates an aspect of the invention, where a sensor device is shown in an assembled state.

FIG. 6 schematically illustrates another embodiment of the invention, where the middle part 26 of the elongated sensor housing 3 is longer than in the embodiment shown in FIG. 5, and the two detachable end parts 27, 28 are of substantially similar lengths. Fixing means 9 are arranged astride the two detachable parts 27,28 and the middle part 26 illustrated in stapled lines in FIG. 6. Though not limited to the example shown in FIG. 6, typical fixing means 9 preferably comprise an arrangement where screws are threaded into threaded holes between the detachable parts 26,27,28, the screws being accessible by screwing means in recesses at the one ends of the elongated sensor housing in the longitudinal direction of the outer sensor housing 4. In other configurations the fixing means 9 may comprise screw threads on the detachable parts 27,28 and middle part 26, configured to engage with each other, thereby allowing the detachable end parts 27,28 to be screwed on to the middle part 26.

The middle part 26 may in aspects be of constant diameter D, thus forming a cylinder shape, whilst the detachable end parts 27,28 taper towards their respective termination points on the longitudinal axis of the elongated sensor housing 3. The middle part 26 may typically comprise a material configured to withstand high loads, such as steel, aluminum and/or titanium. The detachable end parts 27,28 may comprise materials with relatively lower resistance to high loads, but which are formed of plastics or other materials allowing wireless transmitting of signals through the detachable end parts 27,28. Thus, it may be preferable to locate an antenna at least towards each detachable end part 27,28, even more preferably the antennae extend into the detachable end parts 27,28.

FIG. 7 schematically illustrates the outer housing surface 4 displaying a plurality of grooves 10. The number of grooves 10 and their angle $\varphi$ relative to the longitudinal axis of the sensor device 1, spacing S, width W and depth B may vary according to the particular line 2 the sensor device 1 is to be fitted in. The grooves 10 are preferably shaped as semicircular shaped cut outs, with rounded edges, to avoid any cutting or abrasion on the line 2. The function of the grooves 10 is to distribute pressure more equally across the outer surface housing 4, and provide a better grip for the strands 18 to avoid slipping of the sensor device 1 inside the line 2. Other patterns than illustrated in the example in FIG. 7 may also be used, as will be apparent to the person skilled in the art based on the particular kind of line 2 to be used.

Figure 8:
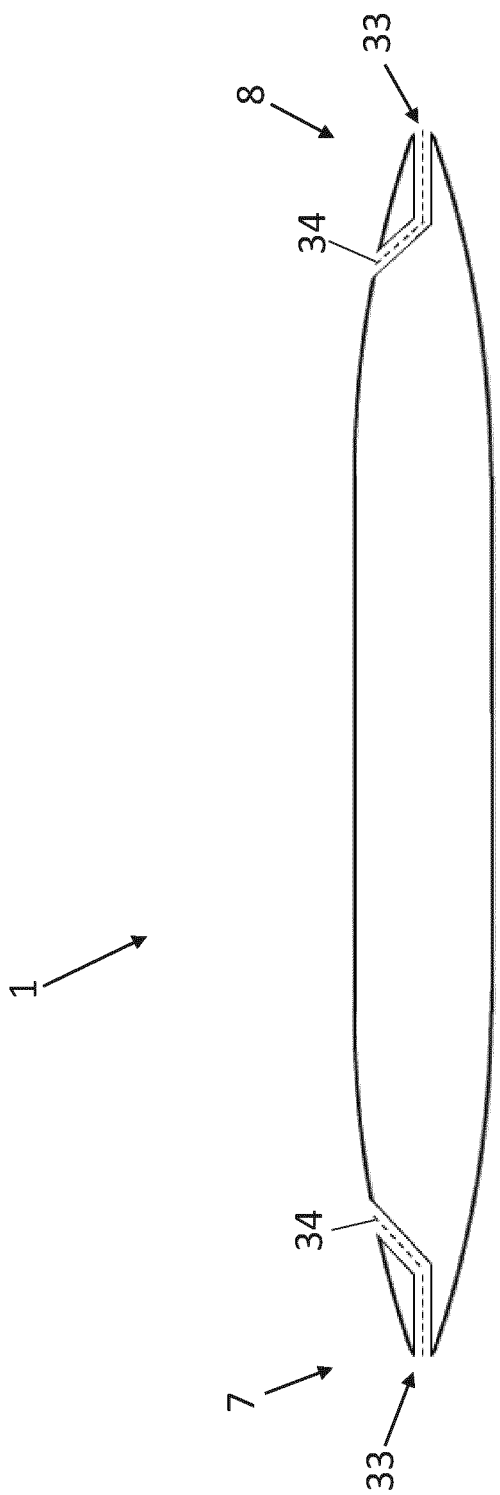
FIG. 8 schematically illustrates an aspect of the invention, where an example of a sensor device comprising core strand attachment means are shown.

FIG. 8 illustrates a sensor device 1 with a core strand attachment means 33 comprising a through-going hole at both ends 27,28 of the elongated sensor housing 3 in the longitudinal direction. The stapled line shown running through the hole illustrates how at least one core strand 34 may be threaded through the core strand attachment means 33. In some aspects, one core strand 34 may pass through both core strand attachment means 33, whilst it is also possible with several core strands 34, or only one single core strand attachment means 33 and one corresponding core strand 34.

Figure 9:
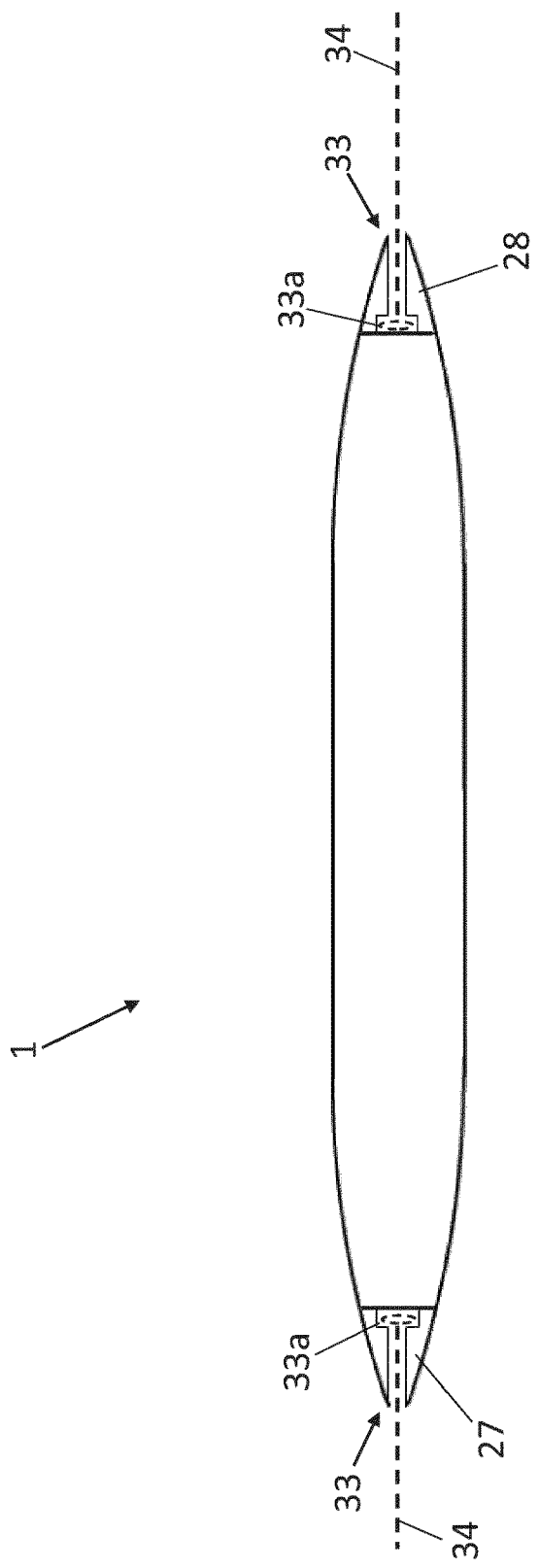
FIG. 9 schematically illustrates an aspect of the invention, where another example of a sensor device comprising core strand attachment means are shown.

FIG. 9 illustrates another aspect of a core strand attachment means 33 where the ends 27,28 of the elongated sensor housing 3 in the longitudinal direction are removably connected. After removing the ends 27,28 of the housing, a core strand 34 is threaded through the channel and knotted or spliced at its end, or fixed with attachment means, creating a knot or line end with a larger diameter than the recess through which it was threaded, and thereby attaching the housing end 27,28 to the end of core strand 34. The innermost part of the channel 33a of the core strand attachment means 33 comprises a larger average radial diameter to accommodate the knotted or spliced end of the core strand 34. A larger average radial diameter may preferably entail up to a 15% increase in average radial diameter, most preferably up to a 25% increase, for example 20%. The ends 27,28 of the elongated sensor housing in the longitudinal direction are then attached back on to the sensor housing 3, and the sensor device 1 is thus attached to the core strand 34.

Figure 10:
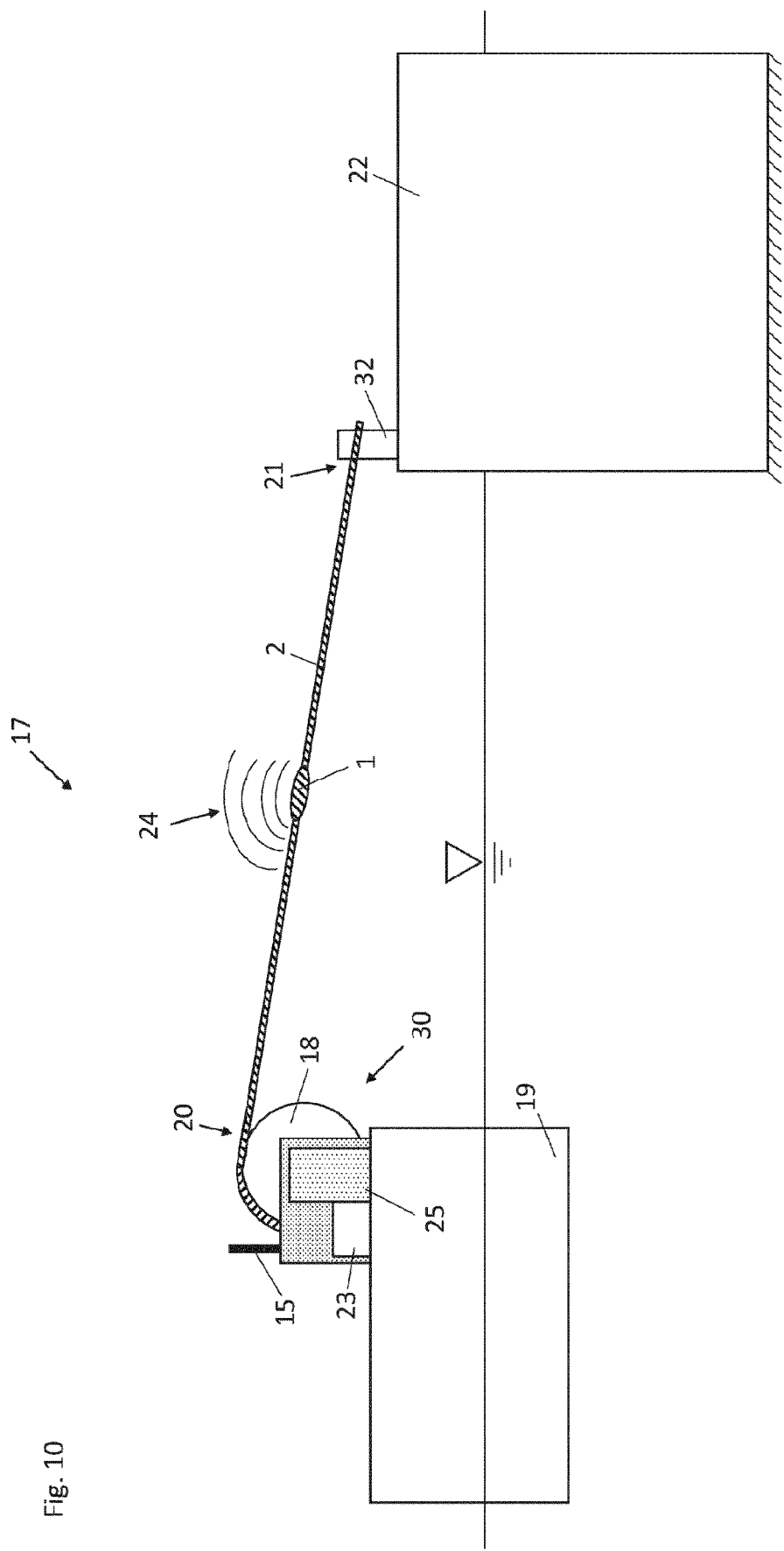
FIG. 10 schematically illustrates an aspect of the invention, where a line sensor assembly including a line and a sensor device is arranged between two structures.

FIG. 10 schematically illustrates a line sensor assembly 17, where a first end 21 of a line 2 is secured to a winching means 18 arranged on a first structure 19. A second end 22 of the line 2 is secured to a post, such as a bollard post, arranged on a second structure 22. The first structure 19 could be floating structure, for example a ship, and the second structure could for example be a dock 22. Inserted into the line 2 is a sensor device 1 for measuring tension in the line 2. In FIG. 10 the sensor device 1 comprises a wireless transmitting means 16 to transmit data signals 24 to a data receiver 15 mounted on the winching means 18.

A winch motor 25 in the winching means 18 is coupled to a drum, capstan or similar for reeling the line 2 in or out. The winch motor 25 may be an electric motor, which is controlled by a control system 23, the control system 23 being arranged to process data signals 24 from the sensor device 1. The control system 23 is further arranged to calculate/estimate tension in the line 2 based on the received data signals 24, and determine whether the motor 25 should perform any adjustments by reeling the line 2 in or out. The control system 23 preferably also comprises data recording means, such that information regarding the use of a specific line 2 can be stored for later use. Furthermore, the control system 23 is configured to analyze data concerning the previous use of the line 2, and use this information in the determination of how much tension a specific line 2 should be subjected to, or when the line should be replaced. The control system 23 can also be connected to an alarm or signaling means arranged on the winching means 18, and/or it could be connected to an external device such as a mobile phone, PC, the control system on the bridge of a vessel or similar devices.

Prior to deployment of the line sensor assembly 17, the sensor device's 1 configurations should be set, for example the transmission frequency of data signals. Deployment of the line sensor assembly 17 then starts with insertion of the sensor device 1 into a line 2 at a predetermined insertion point 12. The control system 23 is preferably pre-programmed with a set of instructions and fed with data concerning the line 2, such as previous use and maximum tension limit. The line 2 is then reeled out from the winching means 18 and the second end 21 secured to a second structure 22. The winching means 18 adjusts the line to a desired state of tension, this may also be performed by an operator according to a visual estimate or it may be limited by a parameter pre-programmed in the control system. As the line 2 is tensioned, the sensor device 1 starts transmitting signals regarding pressure and/or temperature. These signals are then processed in the winching means 18, bringing the line 2 to a desired tension. The sensor device 1 will then transmit signals in set intervals or when necessary, and the winching means 18 will adjust tension in the line 2 accordingly.

Figure 11:
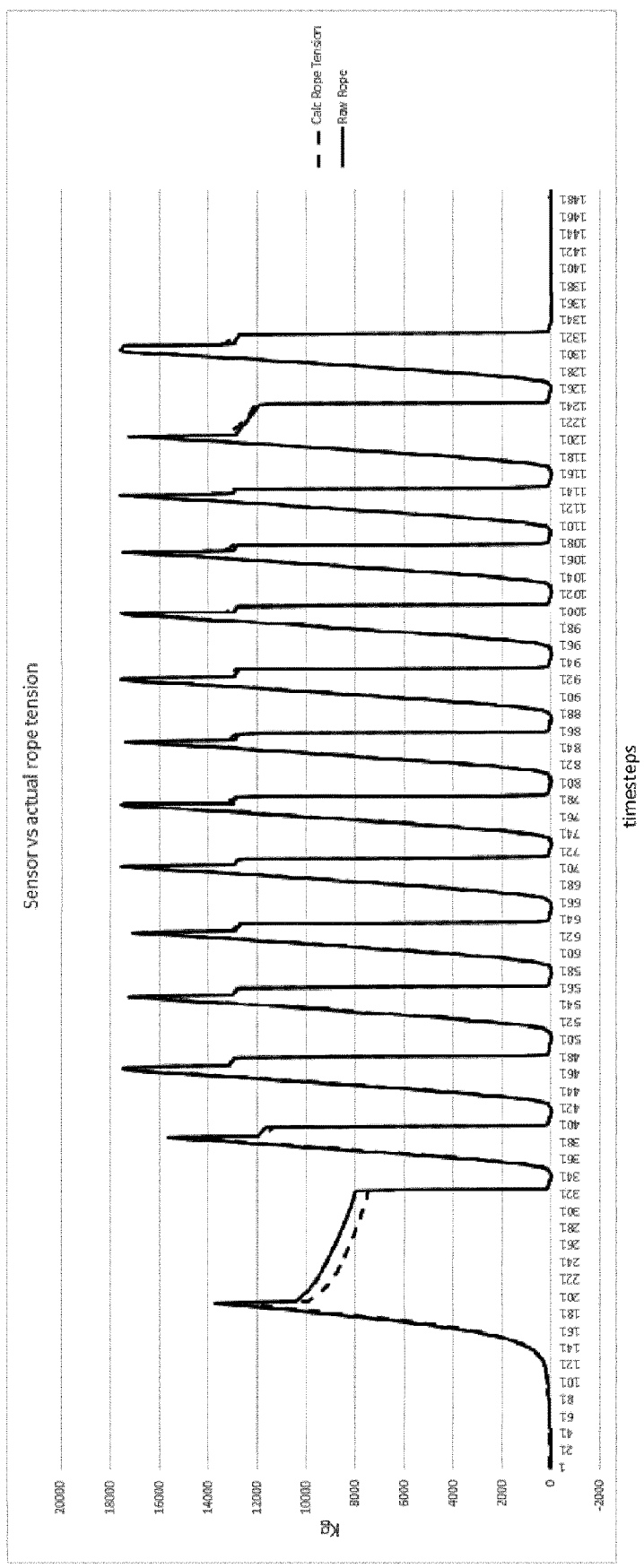
FIG. 11 illustrates measurements collected during testing of a sensor device, comparing the sensor device's measured tension with actual tension in the line.

FIG. 11 illustrates measurements collected during testing of a sensor device, where a line with a sensor device is placed in a line tensioning device and subjected to specific tensions shown in kg on the y-axis over a period of time shown on the x-axis. The actual applied tension is then measured by external logging units in the line tensioning device illustrated by the full line labeled "raw rope", and compared with tension measured by the sensor device in the line illustrated by the stapled line labeled "calc rope tension". As shown, the line sensor assembly is subjected to cyclic testing in order to verify that the sensor device reads the accurate line tension values at each cycle with repetitive and predictable results. The sensor was inserted into the line at several different positions within the same line in order to verify the sensor ability to produce repetitive and accurate tension values for the line, independently of the sensors axial and rotational position within the line. The graph clearly shows the accuracy of the sensor device in measuring tension indirectly through compression.

In the preceding description, various aspects of the assembly according to the invention have been described with reference to the illustrative embodiment. For purposes of explanation, specific numbers, systems and configurations were set forth in order to provide a thorough understanding of the apparatus and its workings. However, this description is not intended to be construed in a limiting sense. Various modifications and variations of the illustrative embodiment, as well as other embodiments of the apparatus, which are apparent to persons skilled in the art to which the disclosed subject matter pertains, are deemed to lie within the scope of the present invention.

The invention claimed is:

1. A sensor device for insertion and for measuring tension within a braided, plaited and/or laid line, the sensor device being shaped as a prolate spheroid and comprising;
    an elongated sensor housing having an outer housing surface and an inner housing surface, the outer housing surface having a substantially elliptic or circular cross sectional area around the longitudinal centre axis of the sensor housing, and at least part of the maximum diameter D of the elongated sensor housing measured in direction perpendicular to a centreline C of the housing's longitudinal direction is constant along at least a portion of the housing's longitudinal length L,
    at least one pressure sensor arranged inside the elongated sensor housing, the at least one pressure sensor being configured to measure, at least indirectly, a pressure exerted on the outer housing surface,
    wherein the elongated sensor housing comprises a middle part and two end parts that are removably connected to the sensor housing by a fixing arrangement such that the removal of at least one end part of the elongated sensor housing allows free access to the internally arranged at least one pressure sensor, and the wherein the fixing arrangement comprises screw threads on the detachable end parts and middle part, configured to engage with each other, thereby allowing the detachable end parts to be screwed on to the middle part.

2. The sensor device according to claim 1, wherein the elongated sensor housing comprises aluminum, steel or titanium, and at least one end comprises materials such as hard plastics, polymer-based compounds for example comprising nylon, PEEK, POM and fiber reinforced composites.

3. The sensor device according to claim 1, wherein the sensor device further comprises;
    at least one temperature sensor arranged within the sensor housing, the at least one temperature sensor being configured to measure, at least indirectly, temperature within a braided, plaited and/or laid line at or near an insertion point of the sensor device into the line.

4. The sensor device according to claim 1, wherein the sensor device further comprises;
    a data recording unit arranged within the sensor housing for recording data received from any of the at least one pressure sensor.

5. The sensor device according to claim 4, wherein the sensor device further comprises;
    a data recording unit arranged within the sensor housing for recording data received from the at least one pressure sensor or the at least one temperature sensor or a combination thereof.

6. The sensor device according to claim 4, wherein the sensor device further comprises;
    a data transmitting unit arranged within the sensor housing for transmitting data signals from the data recording unit to an external receiver during use.

7. The sensor device according to claim 6, wherein the data transmitting unit comprises wireless transmitting means.

8. The sensor device according to claim 1, wherein at least one end of the elongated sensor housing in the longitudinal direction comprises a core strand attachment means for attaching a core strand.

9. A line sensor assembly, wherein the line sensor assembly comprises;
  a braided, plaited and/or laid line and
  at least one sensor device arranged centrally within braided, plaited and/or laid line, the at least one sensor device comprising
  a sensor housing having an outer housing surface and an inner housing surface, the outer housing surface having a substantially elliptic or circular cross sectional area around the longitudinal centre axis of the sensor housing, and
  a pressure sensor arranged inside the sensor housing, the pressure sensor being configured to measure, at least indirectly, a pressure exerted on the outer housing surface,
  wherein the at least one sensor device is in accordance with any one of claims 1-8.

10. The line sensor assembly according to claim 9, wherein the assembly further comprises;
  a first securing means arranged on a first structure,
  wherein a first line end of the braided, plaited and/or laid line is fastened to the first securing means and a second line end of the braided, plaited and/or laid line is fastened to a second securing means arranged on a second structure.

11. The line sensor assembly according to claim 10, wherein the first securing means comprises a winching means, being configured
  to receive tension related data from the at least one sensor device in use, and
  to reel out or in the braided, plaited and/or laid line, or be still, in accordance with the tension related data received from the at least one sensor device and pre-programmed instructions.

12. The line sensor assembly according to claim 11 wherein the winching means comprises;
  a data receiver for receiving data signals from the at least one sensor device in use,
  a winch motor for reeling in or out the braided, plaited and/or laid line such that the line tension is changed and
  a control system for processing received data signals and to control the reeling operations set by the motor.

13. The line sensor assembly according to claim 9, wherein the assembly further comprises
  at least one data receiver for receiving data signals from the at least one sensor device and
  a control system for processing received data signals.

14. A method of adjusting the tension in a line sensor assembly according to any of claims 9-12, the method comprising the steps of:
  measuring, at least indirectly, pressure in a direction perpendicular to the longitudinal direction of the sensor housing,
  transmitting the data from the sensor device to a winching means,
  processing the data in a control system and
  determining, based on pre-programmed instructions and the processed data, whether or not the tension in the braided, plaited and/or laid line should be adjusted.

* * * * *